United States Patent
Barbaresco et al.

(10) Patent No.: US 6,438,253 B1
(45) Date of Patent: Aug. 20, 2002

(54) PROCESS FOR DYNAMIC MONITORING OF CHANGES TO DEFORMABLE MEDIA, AND PREDICTION OF CHANGES THEREOF

(75) Inventors: Frédéric Barbaresco, Montgeron; Samuel Legoupil, Paris; Bernard Monnier, Morangis, all of (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/326,638

(22) Filed: Jun. 7, 1999

(30) Foreign Application Priority Data

Jun. 5, 1998 (FR) .............................. 98 07095

(51) Int. Cl.$^7$ ................................................ G06K 9/00
(52) U.S. Cl. ...................................................... 382/103
(58) Field of Search .............................. 382/100, 103, 382/107, 172, 181, 197, 206, 254, 257, 259, 260, 276, 277, 312; 702/3; 706/931; 342/26, 147, 409

(56) References Cited

U.S. PATENT DOCUMENTS

| | | | | |
|---|---|---|---|---|
| 5,148,500 A | * | 9/1992 | Belanger | 382/259 |
| 5,173,945 A | * | 12/1992 | Pieters et al. | 382/107 |
| 5,224,179 A | * | 6/1993 | Denker et al. | 382/259 |
| 5,729,465 A | | 3/1998 | Barbaresco | 702/76 |
| 5,734,756 A | * | 3/1998 | Sherman et al. | 382/259 |
| 5,757,953 A | * | 5/1998 | Jang | 382/132 |
| 5,966,129 A | * | 10/1999 | Matsukuma et al. | 345/418 |
| 6,058,219 A | * | 5/2000 | Patridge | 382/259 |
| 6,134,353 A | * | 10/2000 | Makram-Ebeid | 382/259 |
| 6,175,655 B1 | * | 1/2001 | George, III et al. | 382/257 |

OTHER PUBLICATIONS

Hussein M. Yahia, et al., "Fast and Robust Level–Set Segmentation Of Deformable Structures," Proceedings of the 1998 IEEE International Conference On Acoustics, Speech and Signal Processing, Seattle, WA., USA, 12–1, vol. 5, pp. 2765–2768.

S. Legoupil, et al., "Matching of Curvilinear Structures: Application to the Identification of Cortical Sulci on 3D Magnetic Resonance Brain Image," Pattern Recognition in Practice IV: Multiple Paradigms, Comparative Studies and Hybrid Systems; Proceedings of an International Workshop; Vlieland, the Netherlands, Jun. 1–3, 1994; Elsevier, Amsterdam, pp. 185–195.

Brian c. S. Tom, et al., "Motion Estimation of Skeletonized Angiographic Images Using Elastic Registration," IEEE Transactions On Medical Imaging, vol. 13, No. 3, (Sep. 1994), pp. 450–460.

P. Brigger, et al., "Morphological Shape Representation of Segmented Images Based on Temporally Modeled Motion Vectors, " Proceedings on The International Conference On Image Processing, Austin, Nov. 13–16, 1994, vol. 3, No. Conf. 1, (Nov. 13, 1994), pp. 756–760, IEEE.

Ziheng Zhou, et al., "Generic Ribbons: A Morphological Approach Towards Natural Shape Decomposition," Visual Communications and Image Processing IV, Philadelphia, PA, USA, Nov. 8–10, 1989, vol. 1199, pt. 1, pp. 170–180.

* cited by examiner

*Primary Examiner*—Andrew W. Johns
*Assistant Examiner*—Shervin Nakhjavan
(74) *Attorney, Agent, or Firm*—Oblon, Spivak, McClelland, Maier & Neustadt, P.C.

(57) ABSTRACT

The process according to the invention used for weather radar images is used for dynamic monitoring of cloud masses, particularly to predict future changes. It consists essentially of creating the skeleton of each cloud mass, for several images at different times, determining the displacement vectors for segments of vectorized skeletons, and extrapolation to rebuild the predicted skeletons.

13 Claims, 1 Drawing Sheet

PROCESS FOR DYNAMIC MONITORING OF CHANGES TO DEFORMABLE MEDIA, AND PREDICTION OF CHANGES THEREOF

BACKGROUND AND SUMMARY OF THE INVENTION

This invention relates to a process for dynamic monitoring of changes to deformable media, and for predicting these changes.

In domains such as air traffic control, it is important not only to monitor trajectories followed by aircraft to guide them, but also to know the weather conditions within the radius of action of the instruments used for this control, and particularly for detecting and precisely localizing cloud formations that could be dangerous or simply unpleasant for persons in the aircraft. This is usually done using weather radars, for which the echo images are displayed on the control center screen after eliminating echoes due to fixed obstacles. Human interpretation of these types of image is often complicated and these images cannot be used to forecast changes to cloud formations. Furthermore, an air traffic controller needs to know the weather conditions and how they will change in order to optimize routing of aircraft that he is responsible for guiding and to understand any route changes decided upon by the captain to avoid cloud formations that he considers are dangerous. The article by F. BARBARESCO, S. BONNEY, J. LAMBERT and B. MONNIER published in IEEE International Conference on Image Processing—I.C.I.P. 96, in Lausanne (Switzerland) in September 1996 entitled "Motion Based Segmentation and Tracking of Dynamic Radar Clutter" describes a process for processing this type of image by determining active contours with a constraint model, but this process has two disadvantages; firstly it requires a prohibitive calculation time, and secondly it cannot manage complex deformations (it simply manages deformations that can be approximated by an affine deformation model).

The purpose of this invention is a process for dynamically monitoring the variation of deformable media that can be used for this monitoring and for creating relatively reliable forecasts of how the deformations will change, without requiring a prohibitive calculation time.

The process according to the invention for dynamic monitoring of deformable media consists of using at least two images taken at different times obtained by at least one sensor, establishing the skeleton of each distinct assembly in this medium for each image, and then making the image skeletons in question correspond to each other.

This correspondence is made by vectorizing the skeletons of the processed images, examining the vectors of these skeletons taken in pairs, and each time attempting to match two vectors with approximately the same geometric characteristics. Skeletons of assemblies, and if required the corresponding assemblies, can be rebuilt from these matched skeletons.

Advantageously, the image may be preprocessed before the skeletons are built up. This preprocessing may include a filter step (frequency and/or morphological filtering), and a thresholding step eliminating image components that are not relevant for the problem in question. The processing can advantageously be facilitated by simplifying the skeletons by vectorization (thinning and/or search for points at which curves representative of skeletons have a curvature greater than a determined value and then linearization) and/or elimination of insignificant artifacts or barbules.

According to one aspect of the process according to the invention, a map of displacement vectors is created for at least one area of interest in the processed images.

According to another aspect of the invention, a predicted image is built up starting from displacement vectors and/or the skeleton. Another possible way of rebuilding the above mentioned image is to use the skeleton displacement vectors to calculate the displacement of each pixel image and to rebuild the predicted image from the newly predicted pixel locations.

According to another aspect of the process according to the invention, attributes are applied to at least some of the pixels in several images taken at different times, the characteristics of the corresponding areas are determined, and information about the variation and/or the nature of areas is thus enriched. These attributes are particularly the change in the area or volume of deformable media, their density, and the local variation of density within these media.

BRIEF DESCRIPTION OF THE DRAWINGS

This invention will be better understood after reading the detailed description of one embodiment used as a non-restrictive example and illustrated by the attached drawing, in which.

DESCRIPTION OF THE PREFERRED EMBODIMENT

The invention will be described in detail below for application to weather radar systems, but obviously it is not restricted to this application alone, and it may be used in many other domains in which deformable media are to be dynamically monitored and for which data may be available (for example signal shapes, images, etc.) obtained using at least one appropriate sensor, and for which it may be necessary to predict changes. For the purposes of this description, a "deformable medium" is a set of particles and/or groups of particles and/or sets of objects and/or organisms, that may be gaseous and/or liquid and/or solid, these elements changing in a non-uniform manner with time, with deformation gradients that may vary with time and/or from one assembly to another.

Some of other domains to which this invention may be applied are particularly:

space observations: monitoring of natural phenomena and/or man-controlled phenomena such as flooding, snow cover, desertification of arable land and/or new crop land, river or sea pollution (by oil, etc.), etc., oceanography: monitoring the variation of the ocean temperature gradient (fronts, vortices, submarine currents, etc.) on infrared or near ultraviolet space images (due to phyto-plancton). The collected images are useful for marine meteorology, and for modeling the propagation of sonar waves (communications and detection of submarines, etc.), medicine: for the treatment of medical images (M.R.I., tomography, etc.) for monitoring pathologies; study of heart dynamics, monitoring of cerebral activity, monitoring changes to tumors, etc., fluid mechanics: monitoring of volutes (by coloring) of non-stationary flows such as flows that occur along a wall, or injection of fuel into a combustion chamber, etc.

Figure 1:
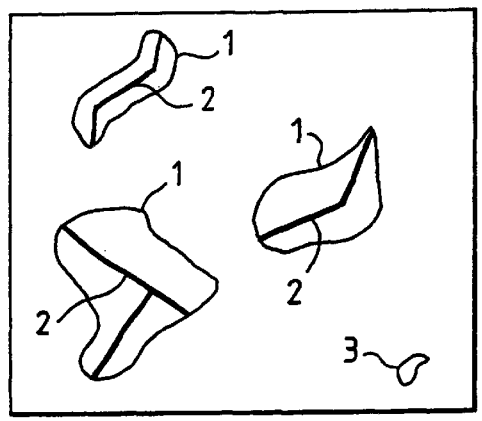
FIG. 1 is a simplified diagram of a weather radar display screen, which shows the skeletons of several cloud formations built up according to the invention.

FIG. 1 shows the contours of a few cloud formations 1, such as those recorded using a weather radar and displayed on a screen, for example an air traffic control station screen. The image thus displayed has been preprocessed in a known manner in itself, to eliminate all ground clutter (due to relief, swell, fixed obstacles) if necessary.

The corresponding skeleton 2 has been plotted for each of these cloud formations. Obviously, cloud covers 3 with a negligible. radar reflection intensity which cannot present any risk at the moment considered, are ignored. The calculation of closed contour skeletons is known in itself; for example the Danielson algorithm (see the article entitled "Euclidean Distance Mapping" published in the Computer Graphics & Image Processing review, volume 14, pages 227–248, 1980), or the ultimate eroded algorithm (mathematical morphology), can be used.

It will be seen that the images mentioned above are two-dimensional, but it is obvious that three-dimensional information can be obtained, for example by studying a series of two-dimensional images parallel to each other (cutting cloud masses into "slices") or by processing skeletons in 3 D.

This first step may be used to compress data for an image. It is then simply necessary to build up skeletons of the different assemblies in the image as described above, and only to keep information about these skeletons. Obviously, this compression will lead to a certain loss of data.

We will now describe the second step in the process according to the invention, namely creating correspondences between skeletons obtained for successive images of a same area of space.

Figure 2:
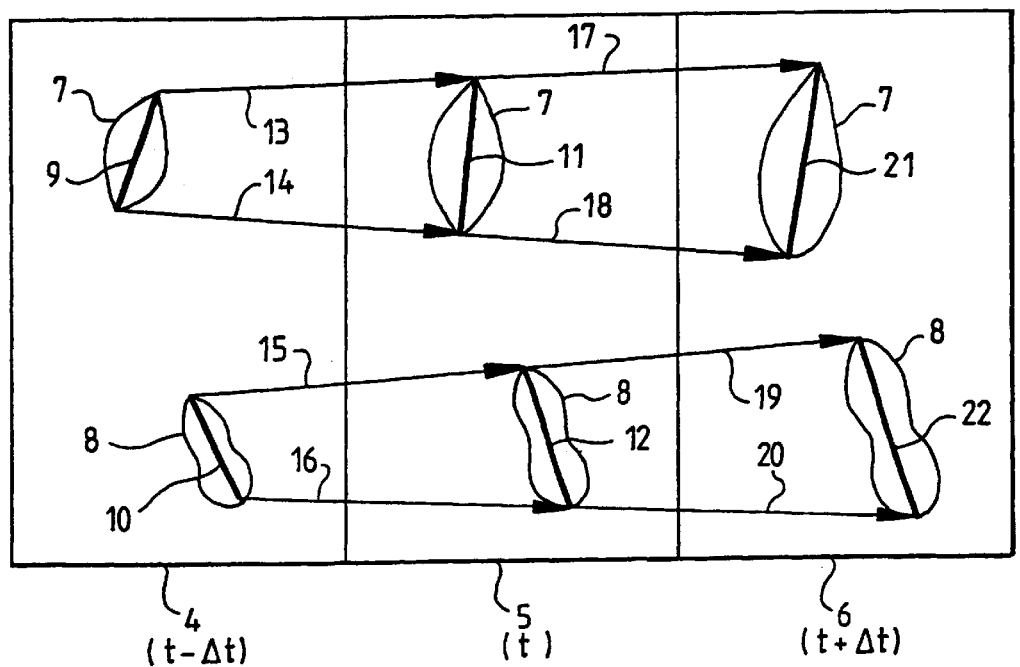
FIG. 2 shows diagrammatic views demonstrating correspondences between radar image skeletons taken in accordance with the invention at different times, for different cases of changes to cloud formations.

FIG. 2 shows three such successive images references 4, 5 and 6 related to cloud phenomena recorded by a weather radar at times t−Δt, t, t+Δt (where t is the time at which the current situation is analyzed). In this case, the time lapse Δt is equal to a few minutes, for example 5 minutes, but obviously this time lapse could be different depending on the phenomena observed, the field of application of the process, the rate at which the phenomena concerned change and the required resolution.

Image 5 at time t shows contours of two cloud formations 7, 8. It can be seen on image 4, produced a few minutes before time t, in other words at time t−Δt, that formations 7 and 8 were already present but were closer to each other than at time t, and that they were slightly smaller than they are at time t.

The process according to the invention is used firstly by plotting the skeletons 9, 10 representing formations 7, 8 respectively at time t−Δt, and then skeletons 11, 12 respectively at time t. These skeletons are then made to correspond. This is done, as shown in an illustrative manner in FIG. 2, by joining the corresponding ends of skeletons 9 to 12 by vectors 13 to 16, images 4 and 5 being placed side by side with image. 5 being to the right of image 4. Thus, vector 13 joins the "upper" end of skeleton 9 to the upper end of skeleton 11, vector 14 joins the "lower" end of skeleton 9 to the lower end of skeleton 11, similarly for skeletons 10 and 12 to obtain vectors 15 and 16. The example in FIG. 2 is very much simplified since skeletons 9 to 12 are almost straight lines, but obviously if the shapes of these skeletons were more complex the procedure would be similar, joining the corresponding characteristic points in the skeletons by a larger number of vectors (ends and junction points of skeleton segments). Details of the embodiment of this correspondence are known in themselves, for example in the article by S. LEGOUPIL & al., "Matching of Curvilinear Structures: Application to the Identification of Cortical Sulci on 3 D magnetic Resonance Brain Image", Pattern Recognition in Practice IV. E. S. Gelsema & L. N. Kanal, pp. 185–195, Elsevier Science B.V., 1994.

To obtain the skeleton at time t+Δt (from image 6, placed side by side with image 5 at its right), each of the vectors 13 to 16 is extended by a length equal to its own length, respectively, thus obtaining vectors 17 to 20. Skeleton 21 is obtained by joining the ends of vectors 17 and 18, and skeleton 22 is obtained by joining the ends of vectors 19 and 20. In the case shown in FIG. 2, vectors 13 and 14 are slightly divergent towards the right, in the same way as for vectors 15 and 16, such that skeletons 11 and 12 are slightly longer than skeletons 9 and 10 respectively. The result is that skeletons 21 and 22 are larger than skeletons 11 and 12 respectively, and consequently the corresponding cloud formations become larger from (t−Δt) to (t) and from (t) to (t+Δt). Obviously, image 6 is simply a prediction calculated at time (t) and it may be corrected if necessary using measurements made at time (t+Δt) so that forecasts for time (t+2Δt) can be calculated.

For the example described above, image 6 in FIG. 2 was obtained by linear extrapolation, but obviously other types of non-linear extrapolations would be possible, particularly when it is observed that forecast images are very different from measured images (due to the rate of change of the size of skeletons and deformations) and it is also obvious that if large variation gradients occur, the time intervals Δt can be reduced, and that the extrapolation may be modified if the gradients vary.

In other cases, the cloud formations may disappear (or their radar echo amplitude may become negligible). Their representations on images also disappear, so that if necessary forecasts concerning neighboring areas can be modified. Conversely, cloud formations can appear and as soon as the amplitude of their radar echo exceeds an experimentally determined value, the corresponding skeleton can be plotted and modified as a function of the change in these cloud masses.

Obviously, the images to be processed to obtain the skeletons may be subjected to different appropriate preprocessing known in itself. This preprocessing may include thresholding and filtering (frequency and/or morphological) in order to eliminate parasites due for example to background noise, elimination of components that are not useful for the problem that arises (in particular, elimination of static image components).

The skeletons obtained may be simplified by vectorization (thinning, search for skeleton points with high curvature, linearisation), and insignificant barbules or different artifacts may be eliminated.

Starting from the skeletons thus obtained, it is easy (if necessary) to plot the contours corresponding to cloud formations, in a manner known in itself. The method of rebuilding a predicted image starting from the predicted skeletons is described above. Another possibility is to use the displacement vectors field (such as vectors 17 to 20 in FIG. 2) and apply these displacement vectors to all image pixels (or at least to all pixels in areas in which cloud formations can vary). Thus, the predicted image is rebuilt by placing the pixels at their new location as determined by these vectors.

The operations mentioned above may obviously be carried out in three-dimensions (3 D). In this case, either the observed space may be cut into parallel "slices" perpendicular to the direction of observation, or data supplied by radar may be in 3 D form (records made for different distance ranges for different elevation angles).

Thus, with the process according to the invention, the shape information (cloud shapes in the example described above) is compressed (data necessary to encode skeletons are much less voluminous than with known processes) so that images can be processed quickly. Cloud displacements and deformations are easy to analyze and extrapolate to give more reliable forecasts. The presentation in the form of an approximate polygonal skeleton (particularly the trunk of the skeleton) is more stationary than a presentation in the form of approximate polygonal contours. These advantages can also be applied in other possible application domains, some of which were mentioned above.

What is claimed is:

1. A method for extrapolating changes in a medium that includes at least a formation that changes over time, the method comprising:

obtaining at least a first image of the medium taken at a first time, and a second image of the medium taken at a second time;

establishing skeletons in the first and second images, at least some of which represent the formation in the first and second images;

creating a correspondence between at least a first skeleton in the first image and at least a second skeleton in the second image, so as to indicate continuity of the formation from the first time to the second time; and based on the created correspondence, extrapolating the first and second skeletons to a third skeleton that represents the formation at a future time in a predicted future image.

2. The method of claim 1, wherein the correspondence creating step includes:

vectorizing the skeletons to produce vectors;

examining in pairs, the vectors of the skeletons; and matching pairs of vectors that have approximately the same geometric characteristics.

3. The method of claim 2, wherein the extrapolating step includes:

building the third skeleton in the predicted future image by extrapolating displacement vectors that extended between the first skeleton and the second skeleton.

4. The method of claim 1, wherein the extrapolating step includes:

building the third skeleton in the predicted future image by extrapolating displacement vectors that extended between the first skeleton and the second skeleton.

5. The method of any of claim 1, 2, 3 or 4, further comprising:

forming a predicted future formation in the predicted future image, based on the third skeleton.

6. The method of any of claim 1, 2, 3, or 4, further comprising:

drawing a map of pixel displacement vectors for at least one area of interest of the first and second images.

7. The method of claim 1, further comprising:

applying displacement vectors to each pixel of the second image to form pixels in the predicted future image.

8. The method of claim 1, further comprising:

determining characteristics of at least some of the pixels in the first and second images; and refining predictions of how corresponding pixels will change, based on the characteristics.

9. The method of claim 1, further comprising:

preprocessing at least one of the first and second images before establishing the skeletons.

10. The method of claim 9, wherein the preprocessing includes at least one of a group including:

frequency filtering, morphological filtering, thresholding, and eliminating image components that are judged not useful.

11. The method of claim 1, further comprising simplifying the skeletons by performing at least one of the steps in a group including steps of:

vectorizing the skeletons; and eliminating insignificant artifacts or barbules.

12. The method of claim 1, further comprising:

compressing data for at least one image by keeping only information about the established skeletons.

13. The method of claim 1, wherein:

the first and second images are weather radar images;

the formation represents a cloud formation; and the third skeleton represents the cloud formation at the future time.

* * * * *